(12) United States Patent
Cupolo

(10) Patent No.: US 7,963,094 B1
(45) Date of Patent: Jun. 21, 2011

(54) FRAGMENTOR FOR BIRD INGESTIBLE GAS TURBINE ENGINE

(76) Inventor: Francis J. Cupolo, Williamsville, NY (US)

( * ) Notice: Subject to any disclaimer, the term of this patent is extended or adjusted under 35 U.S.C. 154(b) by 180 days.

(21) Appl. No.: 12/657,323

(22) Filed: Jan. 19, 2010

(51) Int. Cl.
*F02C 7/05* (2006.01)
*F02C 7/055* (2006.01)

(52) U.S. Cl. .......... 60/39.092; 60/226.1; 244/53 B; 415/121.1

(58) Field of Classification Search .......... 60/204, 60/39.092, 226.1; 415/121.1, 121.2; 244/53 B
See application file for complete search history.

(56) References Cited

U.S. PATENT DOCUMENTS

| | | | | |
|---|---|---|---|---|
| 2,764,390 A | * | 9/1956 | Harris, Jr. | 60/39.093 |
| 3,121,545 A | * | 2/1964 | Meletion | 60/39.092 |
| 3,307,775 A | * | 3/1967 | Petrie | 415/194 |
| 4,116,584 A | | 9/1978 | Bammert | |
| 4,165,849 A | | 8/1979 | Fox | |
| 4,261,168 A | * | 4/1981 | Grigorian et al. | 60/39.092 |
| 4,354,346 A | | 10/1982 | Wooding | |
| 4,617,028 A | | 10/1986 | Ray | |
| 4,833,879 A | * | 5/1989 | Verduyn et al. | 60/39.092 |
| 5,139,545 A | | 8/1992 | Mann | |
| 5,361,665 A | | 11/1994 | Sonefors | |
| 6,089,504 A | | 7/2000 | Williams | |
| 6,089,824 A | | 7/2000 | Soares | |
| 6,129,309 A | | 10/2000 | Smith | |
| 6,149,380 A | * | 11/2000 | Kuzniar et al. | 415/9 |
| 6,536,202 B2 | | 3/2003 | Lo | |
| 6,872,232 B1 | * | 3/2005 | Pavlatos | 60/39.092 |
| 6,883,751 B2 | | 4/2005 | Koncsek | |
| 2007/0140859 A1 | * | 6/2007 | Schreiber et al. | 416/223 R |
| 2008/0253881 A1 | | 10/2008 | Richards | |
| 2009/0016872 A1 | | 1/2009 | Anghileri | |
| 2009/0056309 A1 | | 3/2009 | Roberge | |
| 2009/0101760 A1 | | 4/2009 | Ghogomu | |
| 2009/0145102 A1 | | 6/2009 | Roberge | |

FOREIGN PATENT DOCUMENTS

NL 1001992 * 6/1997

OTHER PUBLICATIONS

Wilbeck, Development of Substitute Bird Model, ASME Trans, Oct. 1981, vol. 103, J. of Engineering for Power, p. 726 equation (3), p. 730 Fig.11; Summary & Conclusions.
Dolbeer, Dolbeer's Rule, Air Safety Week, Nov. 7, 2005, p. 1 second paragraph.
Anghileri, A Strategy to Design Bird-Proof Spinners, 2009 DYNAmore GmbH, 7th European LS-DYNA Conference, 1.Intro, 5.Conclusions.
Martindale, Bird Ingestion & Rolls-Royce Wide Chord Fan, Aug. 1994, Bird Strike Committee Europe, Vienna, Fig.4.

(Continued)

*Primary Examiner* — Ted Kim
(74) *Attorney, Agent, or Firm* — James S Siepierski

(57) ABSTRACT

In an aircraft turbofan or turbojet engine including a fan blade assembly mounted thereon rotating about the central axis of the engine, there are provided aerodynamically profiled rotating cutting rings arranged concentrically to the engine axis upstream of the fan blade assembly on which a bird traveling toward the engine will fragment to extravasations and evisceration to produce bird debris of a sufficiently low density to be safely ingested by the engine.

11 Claims, 4 Drawing Sheets

OTHER PUBLICATIONS

Langewiesche, Fly by Wire, 2009, ISBN:9780374157180, Ch2—The Birds p. 58,59; Ch3—The Collision p. 67,70,71,72,73,74 , Farrar, Straus, & Giroux, NY.

Alexander, Interactive Multimode Blade Impact Analysis, ASME Trans, Apr. 1982, vol. 104, J. of Engineering for Power, p. 292 Summary & Conclusions.

Chamis, Superhybrid Composite Blade Impact Studies, ASME Trans, Oct. 1981, vol. 103, J. of Engineering for Power, p. 736Conclusions, Fig.10.

Bosch, Drivetrain p. 536-547, Automotive Handbook, 3rd ed,., Robert Bosch GmbH,1993.

Brown, Drive Eliminates Wind Inverters, Mechanical Engineering Magazine, vol. 131/No. 7 Jul. 2009 p. 18 ASME.

* cited by examiner

FRAGMENTOR FOR BIRD INGESTIBLE GAS TURBINE ENGINE

BACKGROUND OF THE INVENTION

1. Field of the Invention

The present invention relates to a device and method for protecting an aircraft component from collision with flying objects.

2. Discussion of the Related Art

One of the major hazards to flight safety today is the in-flight impact of birds. Gas turbine engine blading is especially vulnerable to damage. The impact of a bird against a rotating engine blade will create forces for a finite duration of time which are sufficiently high to cause compressive (or shear) failure at the point of contact and also gross structural deformation which may be sufficient to cause failure at some point other than the point of contact.

Although some birds fly above 20,000 feet, and bird strikes have been reported as high as 32,000 feet in the United States and 37,000 feet in Africa, the density of bird traffic decreases exponentially with altitude. Sixty percent of bird strikes occur within a hundred feet of the ground. That figure reflects the crowds of birds in low-altitude flight, and the basic navigational fact that, when startled, birds on the ground have nowhere to go but up, sometimes directly into airplanes that are landing or taking off. Seventy-three percent of bird strikes occur within 500 feet of the ground. For the 27 percent of bird strikes that occur above 500 feet the number of bird strikes declines by 32 percent for every thousand feet of climb. All told, more than 90 percent of bird strikes occur at less than 3,500 feet. There is variation, however, in the outcome of the strikes. Eighty-six percent of those reported cause no damage at all, in part because so many occur just above the ground, where most birds are small, and impact forces are weaker because airplane speeds there are slow.

At the slightly higher altitudes, between 500 and 3,500 feet, the strikes that do occur—some 20 percent of the total—tend to be more dangerous, because airplanes are flying faster and the birds involved are more likely to be large and arrayed in horizontal formation. If you happen to hit one of them, you will likely hit others. At this altitude (500-3,500 feet) the collision closing speed will be a combination of the airplane's 250 miles per hour and an angular component of the geese's own forward speed, which may add 25 miles per hour to the sum.

The industry has come a long way in producing engines that can swallow small birds, and even medium-size ones (such as seagulls; officially, up to 2.5 pounds) without disintegrating or losing significant thrust. The reasons are not difficult to understand. Modern airline engines are hybrids, called turbofans, each of which contains an old-fashioned jet engine in its core, but develops most of its thrust not by shooting a column of high-speed exhaust out the back (as in pure-jet designs), but by reaching forward through itself with a central shaft and driving a propulsion fan. That fan is what you see when you look into the front of an engine. On the engines that power Airbus A320 for example, the fan has a six-foot diameter. It is really just an air pump, similar to an ordinary window fan, but many-bladed, jet-powered, and enormously more forceful. Even when throttled back to minimum speed on the ground, it is capable of sucking in airport workers who stray closer than about six feet to the inlet. More usefully, when it is throttled up to takeoff, climb, or cruise settings, it ingests huge masses of outside air, which it accelerates rearward through the engine casing. At the center of the engine, and just behind the fan, a portion of the accelerated air feeds directly into the jet core, where it is compressed, burned in kerosene-fueled fires, and used to spin turbines (primarily to power the compressors and fan) before being shot as a hot gas out the back. Far more of the fan's accelerated air, however, completely bypasses the jet core and rushes unheated to the rear of the engine, where it returns to the atmosphere. The blown air is known as bypass air. On the A320, it provides as much as 80 percent of the engine thrust.

The fan, in other words, is the ultimate focus of jet-engine design. Its blades overlap, are set at a sharp angle, and are made of strong, flexible, lightweight titanium. These are what birds first hit on the way in, and for the birds the encounter is traumatic.

In any case, turbofan engines are self-protective to some extent, because, when hit by birds, the fan blades may bend without breaking and sling the bird slurry outward, forcing it to blow harmlessly through the bypass ducts, perhaps splattering against protrusions, but never entering the power source—the critical high-speed components that constitute the jet core. Of the 12,028 engines reported to have been struck by birds between 1990 and 2007, two-thirds emerged unscathed from the encounters. Of the remaining third—the engines reported as damaged more than 90 percent continued to produce thrust in some manner, and only 312 were totally destroyed in flight. In short, complete engine failures following bird strikes are rare.

Some, however, will inevitably occur. The reason is that, within the constraints of materials science and practical design, it is simply not yet possible to build turbofan engines that can reliably withstand 250-mile-per-hour collisions with even single birds heavier than the official medium size of 2.5 pounds. In recognition of these realities, certification requirements for the official big-bird test do not require the engine to keep producing thrust, but merely to accommodate its own destruction without running angrily out control, throwing dangerous shrapnel through the engine casing, or bursting fuel lines and catching on fire. Currently, the weight of the big birds used is eight pounds. That is lighter than millions of birds flying around in the North American skies, including typical twelve-pound Canada geese, but it is heavy enough to ensure the death of the (very expensive) test engines. The big-bird tests are single shots, aimed toward the center of the fan, to ensure that parts of the bird are ingested into the critical jet core. Usually a chicken is volunteered for the job. The ASME substitute bird model which accurately reproduces impact loads caused by real birds shows that a 4 kg (8.8 lb) chicken impacting at 112 m/s (275 mph) will produce a 100M Pa (14500 psi) collision shock. The destruction starts when the bird hits the fan. Even as the bird is turning into slurry, it causes fan blades to bend, erode, and fracture-reducing the fan's thrust and sending a hail of titanium debris deeper into the engine. Some of the debris exits harmlessly with the bypass air, but other debris (now mixed with slurry) finds its way into the spinning compressors at the entrance to the jet core, where it sets off a cascade of successive failures, with shattered blades and vanes adding to the destructive hail. In response to the disruption, temperatures inside the combustion chambers may rise so high that the debris passing through is turned to molten metal, which splatters against the downstream turbines, even as they themselves are being warped and destroyed by the heat. Needless to say, any part of the bird that has made it this far is vaporized. Meanwhile, overall, the engine will likely be convulsing as it dies.

It is desirable to provide an aircraft gas turbine engine air-inlet bird fragmentation method and apparatus that is aerodynamic and that fragments large birds faster than the closing velocity of their impending collisions in order to safely reduce such birds and other foreign objects to smaller ingestible harmless pieces.

SUMMARY OF THE INVENTION

In accordance with the teachings of the present invention, a fragmentor for gas turbine aircraft engines is disclosed that employs aerodynamically profiled rotating cutting rings arranged concentrically to the compressor axis on which a bird traveling toward the engine will contact in order to effect extravasations and evisceration to produce bird debris of a sufficiently low density to be safely ingested by the engine.

Additional features of the present invention will become apparent from the following description and appended claims, taken in conjunction with the accompanying drawings.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Bird ingestible gas turbine engine systems and related methods involving bird fragmentation are provided, several representative embodiments of which will be described in detail. In this regard, FIG. 1 is a schematic diagram depicting an exemplary embodiment of a gas turbine engine.

Figure 1:
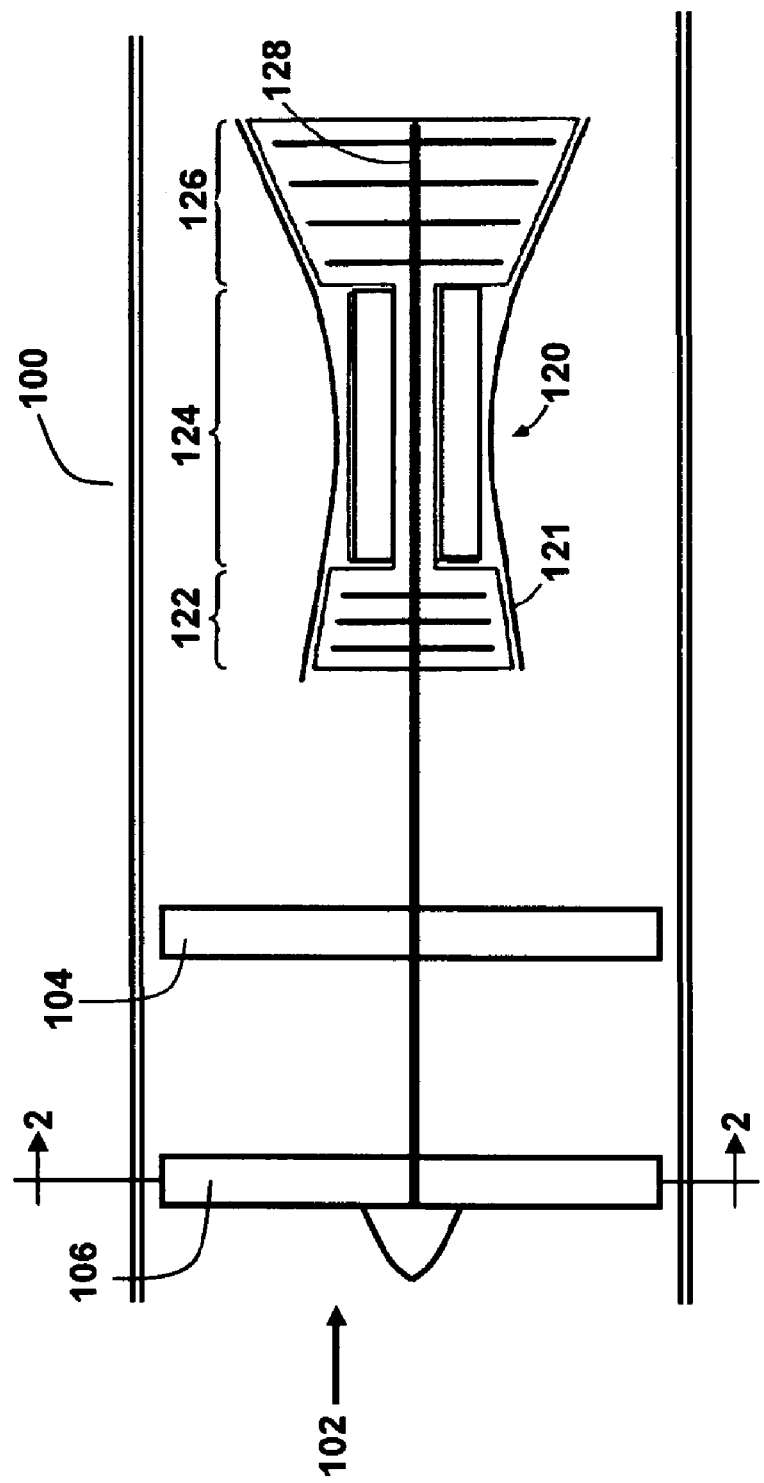
FIG. 1 is a schematic diagram depicting an exemplary embodiment of a gas turbine engine.

As shown in FIG. 1, gas turbine engine 100 incorporates an inlet 102 and bird fragmentor 106 that conduct intake air to a blade assembly 104. In this embodiment, engine 100 is a turbofan, with the blade assembly being configured as a fan. However, in other embodiments, the blade assembly could be a set of blades of a compressor of a turbojet, for example. Thus, the concepts described herein should not be construed as being limited to turbo fans.

Downstream of the blade assembly is located gas turbine core 120. Specifically, one such gas turbine core is used in this embodiment. However, in other embodiments, the gas turbine engine could be various other numbers and arrangements of gas turbine cores. Thus, the concepts described herein should not be construed as being limited to single core gas turbine engines.

The gas turbine core incorporates a casing, a compressor section, a combustion section, and a turbine section, with a shaft interconnecting the compressor section and the turbine section. Thus, gas turbine core 120 includes casing 121, compressor section 122, combustion section 124, turbine section 126 and shaft 128 and provides rotational energy to the blade assembly 104 and fragmentor 106. Notably, although depicted as a single spool core, various other configurations can be used in other embodiments.

Figure 2:
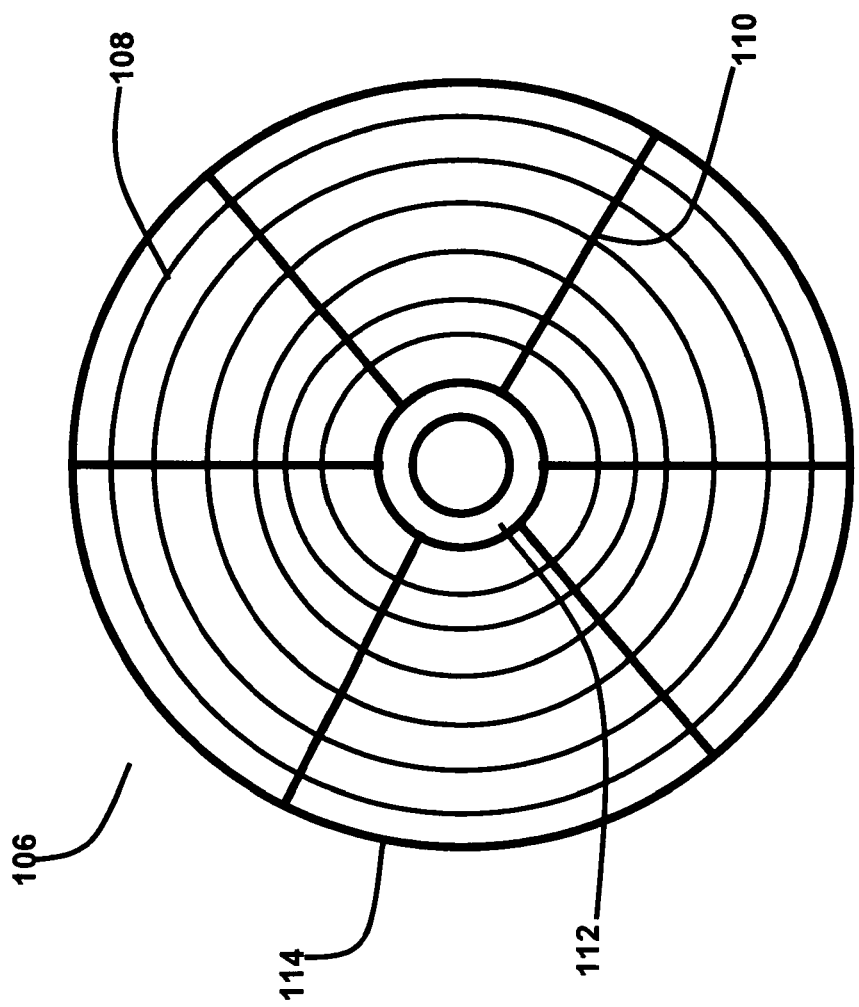
FIG. 2 is a schematic cross-sectional view of the embodiment of FIG. 1.

FIG. 2 is a schematic cross-sectional view of the embodiment of FIG. 1. In particular, FIG. 2 depicts fragmentor 106 with its cutting rings 108 and rim 114 positioned annularly about the centerline of the gas turbine engine, radially supported on spokes 110, and rotatively driven though hub 112 from shaft 128.

Figure 3:
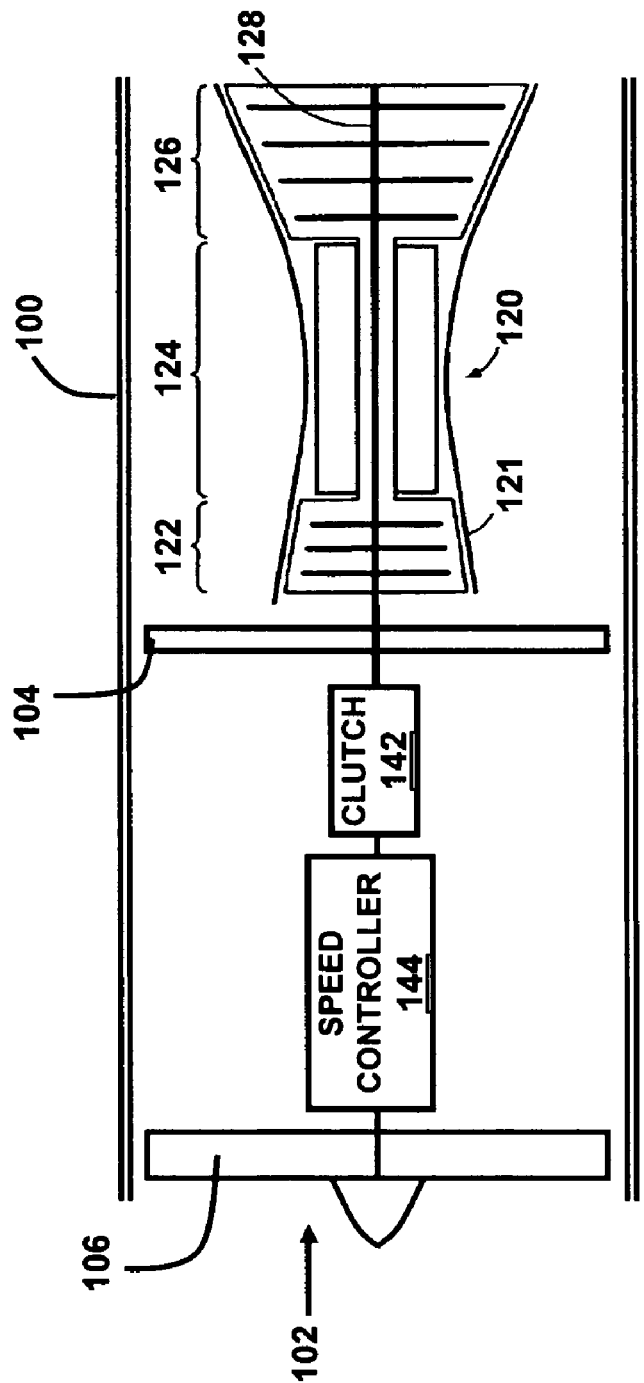
FIG. 3 is a schematic diagram depicting another exemplary embodiment of a gas turbine engine.

In the embodiment of FIG. 3, gas turbine core 120 is coupled to clutch 142 and speed controller 144 to control rotational energy to fragmentor 106 from main shaft 128. Specifically, core 120 is able to selectively apply torque to fragmentor 106 via clutch 142 and speed controller 144.

Figure 4:
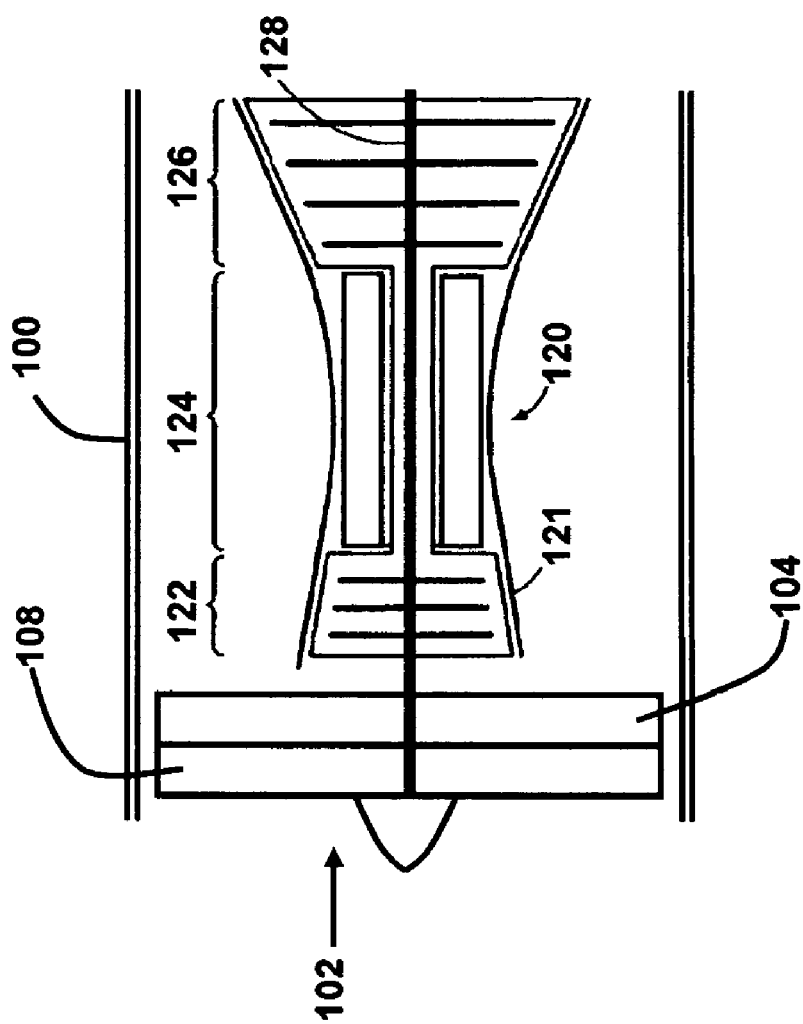
FIG. 4 is a schematic diagram depicting another exemplary embodiment of a gas turbine engine

In the embodiment of FIG. 4, fragmentor cutting rings 108 positioned annularly about the centerline of the gas turbine engine are supported on blade assembly 104.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the exemplary embodiments described herein involve the use of a single stage fragmentor, a multiple stage fragmentor could also be used. As another example, while a speed controller and a clutch also have been described, in other embodiments either a speed controller or a clutch could be used. All such modifications and variations are intended to be included herein within the scope of this disclosure and protected by the accompanying claims.

What is claimed is:

1. A gas turbine engine comprising:
   an inlet;
   a fan blade assembly mounted to receive intake air via the inlet;
   a fragmentor upstream of the fan blade assembly having aerodynamically profiled rotating cutting rings arranged concentrically to the compressor axis on which a bird traveling toward the engine will contact in order to effect extravasations and evisceration to produce bird debris of a sufficiently low density to be safely ingested by the engine;
   a compressor, a combustion section, a turbine and a shaft interconnecting the turbine and the compressor such that rotational energy of the turbine is applied via the shaft to the compressor, fan blade assembly, and fragmentor.

2. The fragmentor of claim 1 having cutting ring material selected from band saw material group including silicon steel, bimetal, spring steel with hardened teeth, titanium, para-aramid synthetic fiber, and polycarbonate resin thermoplastic.

3. The fragmentor of claim 1 having its rings radially spaced 7 to 9 inches.

4. The fragmentor of claim 1 having its cutting rings mounted directly on a support wheel.

5. The support wheel of claim 4 having spokes radially penetrating and securing each cutting ring, and extending to the wheel rim and a hub.

6. The hub of claim 5 having a spline-connection to the shaft.

7. The gas turbine engine of claim 1, further comprising a clutch operative to selectively supply and remove rotational energy, imparted by the turbine to the fragmentor.

8. The gas turbine engine of claim 1, further comprising a speed controlling system to convert shaft variable speed into selectable constant stable input speed to the fragmentor.

9. The speed controlling system of claim 8 selected from the group including variable magnetic coupling, variable frequency drive, torque converter with planetary gear system, gear box, eddy current drive, hydrodynamic coupling, hydrodynamic torque converter, transmission.

10. The fragmentor of claim 1 having its cutting rings mounted directly on the inlet fan blade assembly.

11. The mountings of claim 10 selected from the fastener group which includes bracket, dip, clamp, tab, threaded, slot, pin, hinge, clevis, and spoke.

* * * * *